US012701422B2

(12) United States Patent
Arends et al.

(10) Patent No.: US 12,701,422 B2
(45) Date of Patent: Aug. 4, 2026

(54) GATEKEEPING FOR ROAMING WiFi CALLERS

(71) Applicant: T-Mobile USA, Inc., Bellevue, WA (US)

(72) Inventors: Joel Arends, Renton, WA (US); Nassereddine Sabeur, Bellevue, WA (US); Saqib Badar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 355 days.

(21) Appl. No.: 18/344,834

(22) Filed: Jun. 29, 2023

(65) Prior Publication Data

US 2025/0008333 A1     Jan. 2, 2025

(51) Int. Cl.
| | |
|---|---|
| *H04M 1/66* | (2006.01) |
| *H04W 8/12* | (2009.01) |
| *H04W 12/00* | (2021.01) |
| *H04W 12/06* | (2021.01) |
| *H04W 12/63* | (2021.01) |

(52) U.S. Cl.
CPC ............ *H04W 12/63* (2021.01); *H04W 8/12* (2013.01); *H04W 12/009* (2019.01); *H04W 12/06* (2013.01)

(58) Field of Classification Search
CPC ..... H04W 12/63; H04W 12/08; H04W 12/72; H04W 12/009; H04W 8/12; H04W 12/06; H04L 63/0892; H04L 63/107
See application file for complete search history.

(56) References Cited

U.S. PATENT DOCUMENTS

| | | | |
|---|---|---|---|
| 2013/0242754 A1* | 9/2013 | Shaikh .................. | H04W 24/04 370/242 |
| 2016/0021539 A1 | 1/2016 | Piscopo, Jr. et al. | |
| 2016/0269899 A1* | 9/2016 | Carames ............. | H04W 12/122 |
| 2018/0103409 A1 | 4/2018 | Pawar et al. | |

(Continued)

FOREIGN PATENT DOCUMENTS

WO     2017141175 A1     8/2017

OTHER PUBLICATIONS

"European Search Report Application No. 24181829.3", Mailed Date: Sep. 16, 2024, 9 Pages.

(Continued)

*Primary Examiner* — Shantell L Heiber
(74) *Attorney, Agent, or Firm* — Foley IP Law, PLLC

(57)     ABSTRACT

Gatekeeping for roaming WiFi callers includes: receiving, by a first wireless network node, from a second wireless network node, an authentication request identifying a user equipment (UE) that is requesting a call over WiFi and identifying a network address of the UE; based on at least the network address of the UE, determining a location of the UE; based on at least the location of the UE, determining whether the call is permitted; based on at least determining that the call is not permitted for the UE, responding with a message that blocks the call. Solutions also include: receiving, by the second wireless network node, from a packet data gateway, a request for a call over WiFi; based on at least receiving the request, transmitting the authentication request to the first wireless network node, the authentication request identifying the network address of the UE.

11 Claims, 6 Drawing Sheets

(56) References Cited

U.S. PATENT DOCUMENTS

| | | | |
|---|---|---|---|
| 2018/0115549 A1* | 4/2018 | Chen ........................ | H04W 8/04 |
| 2020/0092941 A1* | 3/2020 | Song ..................... | H04W 4/025 |
| 2020/0107255 A1* | 4/2020 | Cuevas Ramirez .. | H04W 88/06 |
| 2020/0288313 A1* | 9/2020 | Kunz .................. | H04W 12/104 |
| 2021/0068018 A1* | 3/2021 | Kim ................... | H04L 63/0272 |
| 2022/0240214 A1* | 7/2022 | Mao .................... | H04L 61/4511 |
| 2022/0337994 A1* | 10/2022 | Targali ................... | H04W 8/12 |

OTHER PUBLICATIONS

"3rd Generation Partnership Project; Technical Specification Group Core Network and Terminals; Evolved Packet System (EPS); 3GPP EPS AAA interfaces", vol. CT WG4, No. V18.2.0, Mar. 28, 2023, pp. 1-202.

* cited by examiner

RECEIVE, BY A FIRST WIRELESS NETWORK NODE, FROM <u>502</u> A SECOND WIRELESS NETWORK NODE, AN AUTHENTICATION REQUEST, THE AUTHENTICATION REQUEST IDENTIFYING A USER EQUIPMENT (UE) THAT IS REQUESTING A CALL OVER WIFI AND IDENTIFYING A NETWORK ADDRESS OF THE UE

↓

BASED ON AT LEAST THE NETWORK ADDRESS     <u>504</u> OF THE UE, DETERMINE A LOCATION OF THE UE

↓

BASED ON AT LEAST THE LOCATION OF THE UE,     <u>506</u> DETERMINE WHETHER THE CALL IS PERMITTED FOR THE UE

↓

BASED ON AT LEAST DETERMINING THAT THE CALL     <u>508</u> IS NOT PERMITTED FOR THE UE, TRANSMIT, TO THE SECOND WIRELESS NETWORK NODE, A FIRST MESSAGE THAT BLOCKS THE CALL

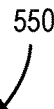

RECEIVE, BY A SECOND WIRELESS NETWORK NODE,     <u>552</u> FROM A PACKET DATA GATEWAY, A REQUEST FOR A CALL OVER WIFI, THE REQUEST INCLUDING A NETWORK ADDRESS OF A USER EQUIPMENT (UE)

↓

BASED ON AT LEAST RECEIVING THE REQUEST,     <u>554</u> TRANSMIT AN AUTHENTICATION REQUEST TO A FIRST WIRELESS NETWORK NODE, THE AUTHENTICATION REQUEST IDENTIFYING THE UE THAT IS REQUESTING THE CALL OVER WIFI AND IDENTIFYING THE NETWORK ADDRESS OF THE UE

↓

RECEIVE A FIRST MESSAGE THAT BLOCKS THE CALL     <u>556</u>

↓

BASED ON AT LEAST RECEIVING THE FIRST     <u>558</u> MESSAGE THAT BLOCKS THE CALL, TRANSMIT, TO THE PACKET DATA GATEWAY, A SECOND MESSAGE THAT BLOCKS THE CALL

GATEKEEPING FOR ROAMING WiFi CALLERS

BACKGROUND

When a user equipment (UE), such as a smartphone, attempts to place a call using a cellular network via a cellular base station, the cellular network knows the location of the UE, and whether it is roaming, by the location of the cellular base station. However, when a UE attempts to place a call using the cellular network via WiFi, the call attempt enters the cellular network with an evolved packet data gateway (ePDG) after traversing another network, such as the internet. Because the internet has a global reach, the UE may be located anywhere.

However, for legal or policy reasons, a cellular network operator may wish to restrict use of cellular network resources by UEs located in certain geographical regions. This is easy for cellular links, merely by not placing any cellular base stations in those certain geographical reasons. However, this does not protect against WiFi calls that may first travel through the internet prior to reaching an ePDG connected to the cellular network.

SUMMARY

The following summary is provided to illustrate examples disclosed herein, but is not meant to limit all examples to any particular configuration or sequence of operations. Solutions are disclosed that provide gatekeeping for roaming WiFi callers and include: receiving, by a first wireless network node, from a second wireless network node, an authentication request, the authentication request identifying a user equipment (UE) that is requesting a call over WiFi and identifying a network address of the UE; based on at least the network address of the UE, determining a location of the UE; based on at least the location of the UE, determining whether the call is permitted for the UE; based on at least determining that the call is not permitted for the UE, transmitting, to the second wireless network node, a message that blocks the call.

Further solutions include: receiving, by the second wireless network node, from a packet data gateway, a request for the call over WiFi, the request including the network address of the UE; based on at least receiving the request, transmitting the authentication request to the first wireless network node, the authentication request identifying the UE that is requesting the call over WiFi and identifying the network address of the UE.

BRIEF DESCRIPTION OF THE DRAWINGS

The disclosed examples are described below with reference to the accompanying drawing figures listed below, wherein:

FIGS. 5A and 5B illustrates additional flowcharts of exemplary operations associated with the architecture of FIG. 1.

Figure 1:
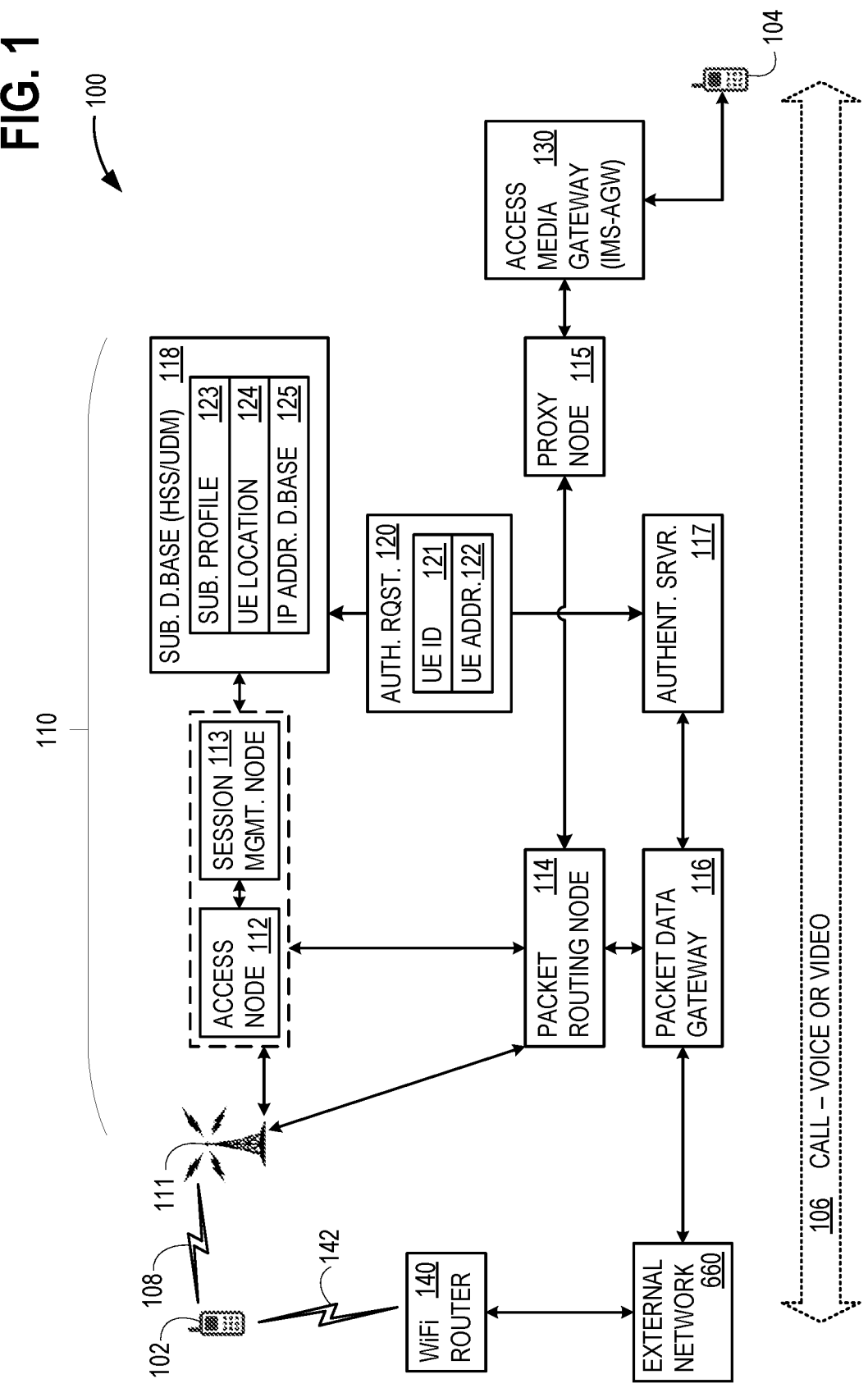
FIG. 1 illustrates an exemplary architecture that advantageously provides gatekeeping for roaming WiFi callers.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Solutions are disclosed that provide gatekeeping for roaming WiFi callers and include: receiving, by a first wireless network node, from a second wireless network node, an authentication request, the authentication request identifying a user equipment (UE) that is requesting a call over WiFi and identifying a network address of the UE; based on at least the network address of the UE, determining a location of the UE; based on at least the location of the UE, determining whether the call is permitted for the UE; based on at least determining that the call is not permitted for the UE, transmitting, to the second wireless network node, a message that blocks the call.

Further solutions include: receiving, by the second wireless network node, from a packet data gateway, a request for the call over WiFi, the request including the network address of the UE; based on at least receiving the request, transmitting the authentication request to the first wireless network node, the authentication request identifying the UE that is requesting the call over WiFi and identifying the network address of the UE.

Aspects of the disclosure improve the cellular communications by introducing a gatekeeping solution for roaming UEs that reach a wireless network (e.g., a cellular network) through the internet from another country and attempt to enter the wireless network using an evolved packet data gateway (ePDG). This prevents potential abuse, misuse, and overuse of wireless network resources, preserving those resources for paying subscribers. This advantageous operation is enabled by at least, based on at least the network address of the UE, determining a location of the UE, and based on at least the location of the UE, determining whether the call is permitted for the UE.

With reference now to the figures, FIG. 1 illustrates an architecture 100 that advantageously provides gatekeeping for roaming WiFi callers. A UE 102 is attempting to place a call 106 to another UE 104 using a wireless network 110, which may be a cellular network such as a fifth-generation cellular technology (5G) network, a fourth-generation cellular technology (4G) network, or another cellular generation network. In normal cellular operation, UE 102 uses an air interface 108 to communicate with a radio access network (RAN) 111 of wireless network 110. Call 106 may be a voice-only call, a video call, or another real-time data session including any of two-way audio, video, and text (e.g., for the hearing impaired).

Wireless network 110 has an access node 112, a session management node 113, a packet routing node 114, a proxy node 115, a packet data gateway 116, an authentication server 117, and a subscriber database node 118. RAN 111 is in communication with access node 112 and packet routing node 114. Access node 112 is in communication with session management node 113 and subscriber database node 118. Packet routing node 114 is in communication with session management node 113, proxy node 115, and packet data gateway 116. Authentication server 117 is in communication with packet data gateway 116 and subscriber database node 118.

In some 5G examples, RAN 111 comprises a gNodeB (gNB), access node 112 comprises an access mobility function (AMF), session management node 113 comprises a session management function (SMF), packet routing node 114 comprises a user plane function (UPF), and subscriber database node 118 comprises a unified data management (UDM) node and/or a home subscriber server (HSS).

In some 4G examples, RAN 111 comprises an eNodeB (eNB), access node 112 comprises a mobility management entity (MME), session management node 113 comprises a system architecture evolution gateway (SAEGW) control plane (SAEGW-C), packet routing node 114 comprises a SAEGW-user plane (SAEGW-U), and subscriber database node 118 comprises an HSS.

In some examples, proxy node 115 comprises a proxy call session control function (P-CSCF), packet data gateway 116 comprises an ePDG, and authentication server 117 comprises an authentication, authorization, and accounting (AAA) server. In some examples, wireless network 110 has multiple ones of each of the components illustrated, in addition to other components and other connectivity among the illustrated components. In some examples, wireless network 110 has components of multiple cellular technologies operating in parallel in order to provide service to UEs of different cellular generations.

Proxy node 115 is in communication with an internet protocol (IP) multimedia system (IMS) access gateway (IMS-AGW) 130 within an IMS, in order to provide connectivity to other wireless (cellular) networks to reach UE 104 or a landline telephone operating on a public switched telephone system (POTS). In some examples, proxy node 115 may be considered to be the IMS. If call 106 is connected, its voice data packets will pass through packet routing node 114, proxy node 115, and IMS-AGW 130.

In the illustrated scenario, UE 102 is able to reach packet routing node 114 without going through RAN 111 and access node 112, by instead going through packet data gateway 116. UE 102 reaches packet data gateway 116 using an air interface 142 (e.g., a WiFi air interface) to communicate with a WiFi router 140 that is connected to an external network 660, such as the internet. External network 660 comprises a packet data network, and is described in further detail in relation to FIG. 6. Packet data gateway 116 is also connected to external network 660. This connectivity makes it feasible for UE 102 to place call 106 using WiFi, rather than cellular, entering wireless network 110 via packet data gateway 116.

When UE 102 uses RAN 111 to enter wireless network 110, various nodes of wireless network 110 are able to ascertain the location of UE 102 using its proximity to RAN 111. Air interface 108 is a cellular air interface, with a range on the order of a few miles. This means that, when UE 102 is entering wireless network 110 via RAN 111, the location of UE 102 may be determined (within a matter of miles) using the known location of RAN 111. However, because external network 660 provides world-wide connectivity, the location of packet data gateway 116 (which may be known to various nodes of wireless network 110) provides no indication of the location of UE 102. It is possible for UE 102 to be in any location anywhere that is able to reach the internet.

Figure 2:
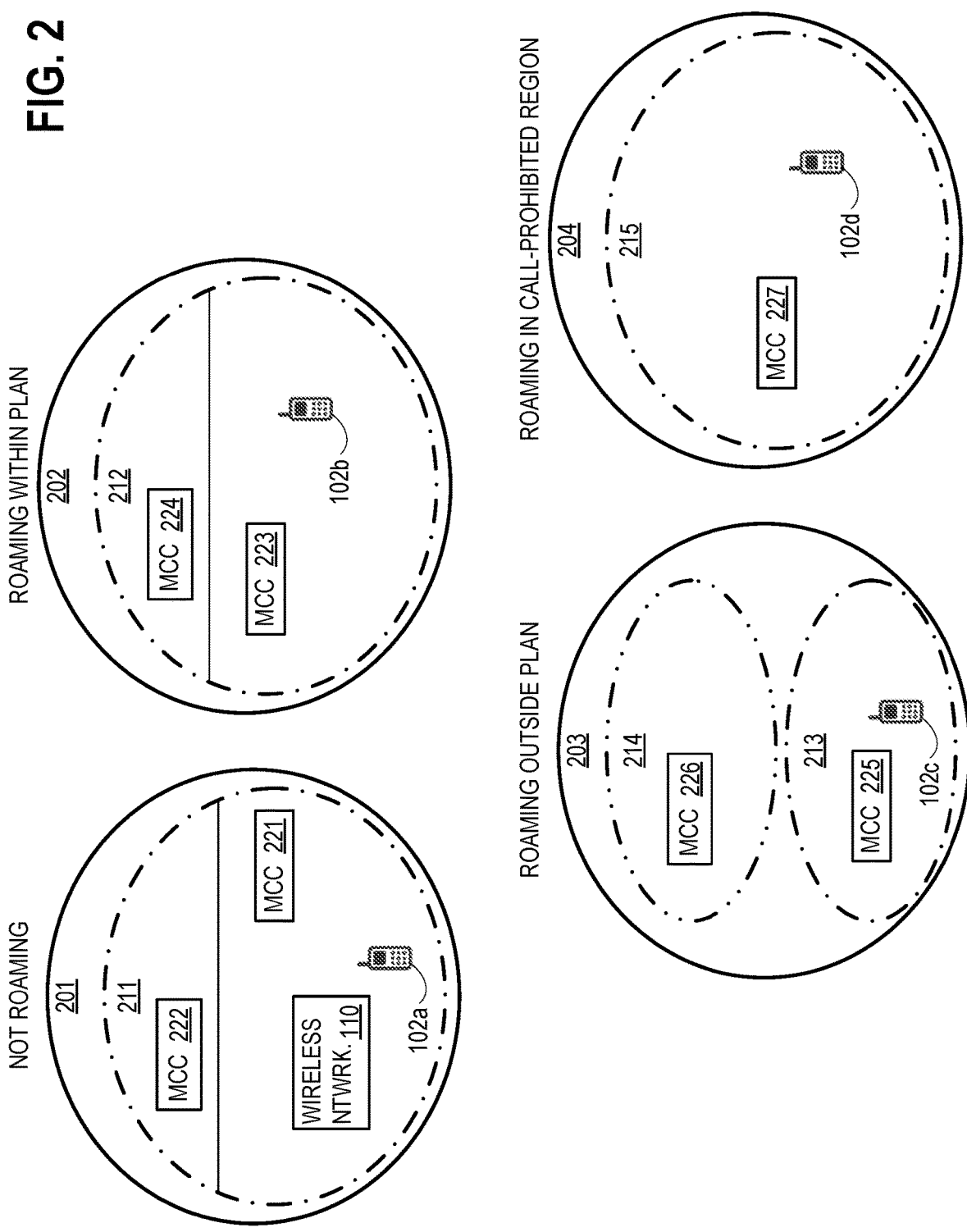
FIG. 2 illustrates various roaming scenarios that may occur with the architecture of FIG. 1.

Turning briefly to FIG. 2, various roaming scenarios are illustrated. A UE 102a is not roaming, because it is in the same geographical region 201 and same country 211 as wireless network 110 operates. In terms of roaming considerations (as opposed to other factors), call 106 will be permitted for UE 102a. In FIG. 2, geographical regions are shown in solid lines and countries are shown in dash-dot lines. A geographical region may coincide with a country, include multiple countries, or be a portion—less than all—of a country.

A country may be associated with a mobile country code (MCC), and some larger countries may be associated with multiple MCCs. For example, the United States has MCCs designated as 310, 311, 312, 313, 314, 315, and 316. Japan has MCCs designated as 440 and 441. China has MCCs designated as 460 and 461. South Korea has one MCC designated as 450, and North Korea has one MCC designated as 467. Country 211 is shown as having two MCCs, an MCC 221 and an MCC 222.

A UE 102b is roaming, because it is in a geographical region 202 and a country 212 different than its home wireless network 110, which is in geographical region 201. Country 212 is shown as having two MCCs, an MCC 223 and an MCC 224. In the scenario depicted, UE 102b is roaming within a country 212 (or geographical region 202) that is within its subscriber plan, so call 106 will be permitted for UE 102b.

A UE 102c is also roaming, because it is in a geographical region 203 and a country 213 different than its home wireless network 110. Geographical region 203 is illustrated as having two countries, a country 213 and a country 214. Country 213 is shown as having an MCC 225 and country 214 is shown as having an MCC 226. In the scenario depicted, UE 102c is roaming within a country 213 (or geographical region 203) that is not within its subscriber plan, so call 106 will not be permitted for UE 102c. That is, if UE 102c attempts to place call 106 from geographical region 203 or country 213, call 106 will be blocked.

A UE 102d is also roaming, because it is in a geographical region 204 and a country 215 different than its home wireless network 110. Country 215 is shown as having an MCC 227. In the scenario depicted, UE 102c is roaming within a country 215 (or geographical region 204) for which calls are prohibited (e.g., by law, regulation, policy, or other factor), independently of any subscriber plan, so call 106 will not be permitted for UE 102d. That is, if UE 102d attempts to place call 106 from geographical region 204 or country 215, call 106 will be blocked.

When a roaming UE attempts to place a call using cellular connectivity, and the call is to pass through its home wireless network (e.g., wireless network 110), the cellular signaling will carry the MCC of the local cellular network to which the UE is connected (where it is roaming). Wireless network 110 is able to use the MCC to determine whether to permit or block the call. For example, when UE 102d attempts to place call 106 using cellular connectivity from North Korea, components of wireless network 110 will identify an MCC value of 427 and block the call.

For WiFi calling, the MCC will not be visible to network 110. Returning to FIG. 1, the ability of wireless network 110 to identify the location of UE 102 will be described. Because, when UE 102 is using WiFi to reach wireless network 110 for a call, such as a voice over WiFi (VoWiFi) or video over WiFi (ViWiFi) call, it passes through external network 660 and needs to receive incoming data packets (e.g., voice data packets intended to be played as audio at UE 102), it must send its own network address (e.g., its IP address). Without sending its own network address, voice data packets sent by distant end UE 104 will not be routed to UE 102.

Network addresses, such as IP addresses, are typically hierarchical, and may have a portion that indicates an approximate geographical area. Typically, when UE 102 attempts to connect to the internet it will be assigned an IP address dynamically, which will be based, at least in part, on where WiFi router 140 connects to the internet.

When connecting to packet data gateway 116, UE 102 will send an identification of itself as a UE identifier (ID) 121 and its network address, shown in FIG. 1 as UE network address 122 ("UE ADDR."). UE network address 122 permits data packets from packet data gateway 116 to reach WiFi router 140, which may have its own addressing scheme to further route data packets to UE 102, versus its other client devices.

External network 660 is untrusted by wireless network 110, because it is outside the control (including configuration control) of the operator of wireless network 110. One of the roles of packet data gateway 116 is to provide a trust interface for wireless network 110 with untrusted networks, such as external network 660. One mechanism that may be used by packet data gateway 116 to establish a trusted connection with UE 102 is an IPsec tunnel. That is, an IPsec tunnel may be established between packet data gateway 116 and UE 102 so that wireless network 110 permits UE 102 to use resources of wireless network 110, despite UE 102 connecting through an untrusted route (e.g., external network 660).

Authentication server 117 plays a role in the determination of whether to permit UE 102 to use resources of wireless network 110 for call 106. Authentication server 117 transmits an authentication request 120 to subscriber database node 118. Authentication request 120 identifies UE 102 (which is requesting call 106 over WiFi) using UE ID 121. Authentication request 120 identifies the network address of UE 102 as UE network address 122.

Subscriber database node 118 has a subscriber profile 123 for UE 102 that identifies whether UE 102 has any roaming privileges at all, and in some examples, which geographical regions and/or countries in which roaming is supported. If UE 102 does not have roaming privileges (as identified in subscriber profile 123), call 106 will be blocked. This may be accomplished by subscriber database node 118 returning a "5004 Roaming Not Allowed" error message to authentication server 117. Authentication server 117 then instructs packet data gateway 116 to not permit the requested call (call 106). In some examples, this is accomplished by authentication server 117 transmitting "5004 Roaming Not Allowed" error message to packet data gateway 116. Packet data gateway 116 then does not permit (i.e., blocks) call 106 for UE 102.

In some examples, if subscriber profile 123 indicates that roaming is allowed in certain geographical regions and/or countries, subscriber database node 118 extracts the location of UE 102 as UE location 124 using UE network address 122 and an IP address database 125. IP address database 125 provides a reference for which IP addresses (or other network addresses) are associated with which geographical regions and/or countries. If UE location 124 indicates that UE 102 is in an area in which roaming is permitted (according to subscriber profile 123), call 106 is permitted. Otherwise, call 106 is not permitted.

In some examples, authentication server 117 has IP address database 125 and identifies UE location 124 using UE network address 122 and an IP address database 125. In such examples, authentication request 120 includes UE location 124 in addition to or in place of UE network address 122.

In some examples, if UE location 124 indicates that UE 102 is in a geographical region (or country) in which calls over WiFi or cellular networks are prohibited, such as by law, policy, or other prohibition. If so, call 106 will be blocked. In some examples, this check is performed prior to determining whether roaming is permitted for UE 102, since it over-rides and roaming permissions identified as granted in subscriber profile 123.

Figure 3:
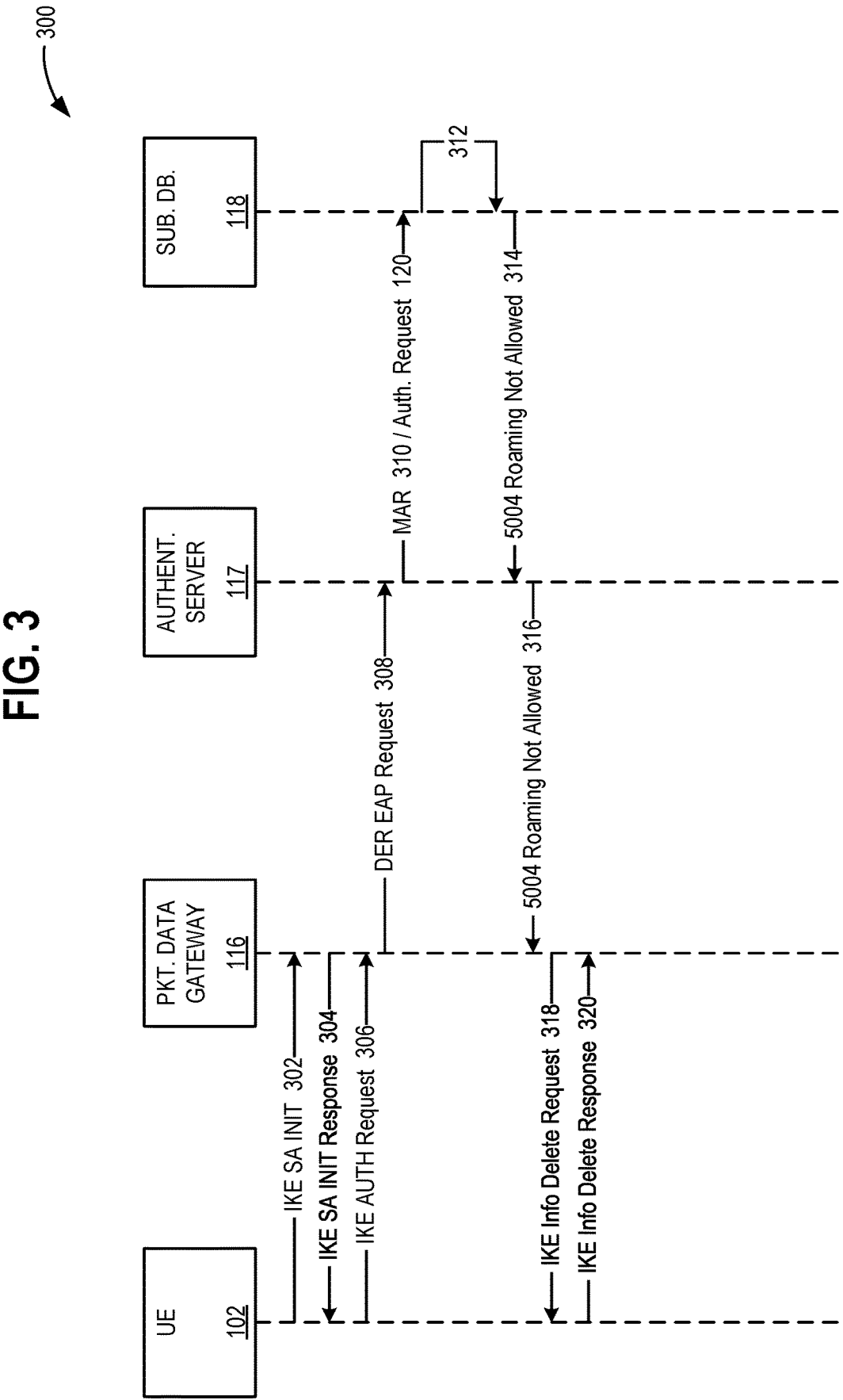
FIG. 3 illustrates a message sequence diagram for messages that may occur when using the architecture of FIG. 1.
Figure 4:
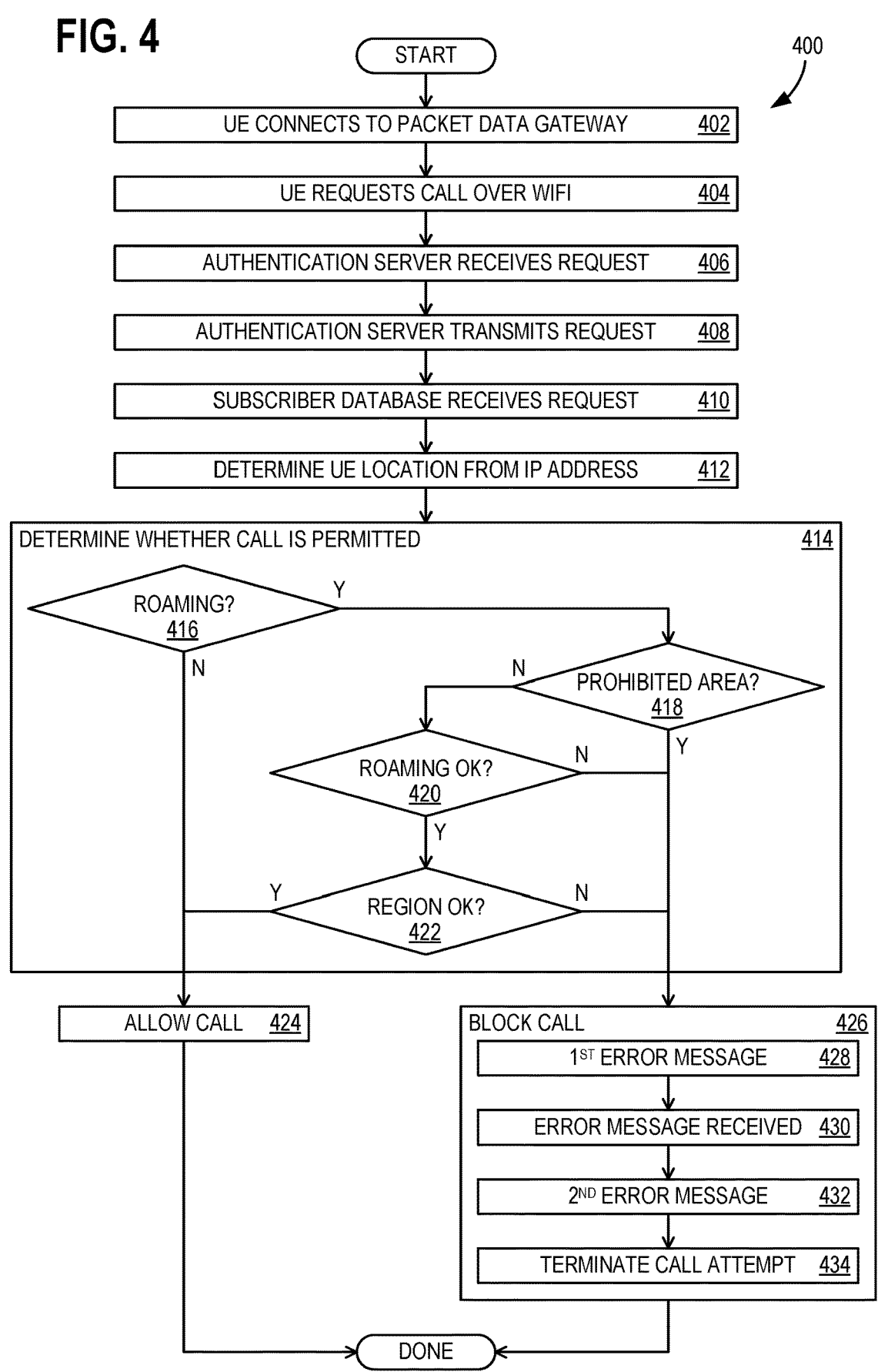
FIG. 4 illustrates a flowchart of exemplary operations associated with the architecture of FIG. 1.

FIG. 3 illustrates a message sequence diagram 300 for messages that may occur when using examples of architecture 100, and FIG. 4 illustrates a flowchart 400 of exemplary operations associated with architecture 100. FIGS. 3 and 4 will be described together. In some examples, at least a portion of flowchart 400 may be performed using one or more computing devices 600 of FIG. 6.

Flowchart 400 commences with UE 102 connecting to packet data gateway 116 in operation 402 of FIG. 4. This is shown in FIG. 3 as messages 302 and 302. Message 302 may be an IKE_SA_INIT message. IKE is the protocol used to set up a security association in the IPsec protocol suite, and IKE_SA_INIT is the initial exchange in which the peers establish a secure channel. Message 304 may be an IKE-_SA_INIT Response message. After completion, further exchanges are encrypted. Packet data gateway 116 may be an ePDG and provides an interface between wireless network 110 (comprising packet data gateway 116) and untrusted external network 660.

UE 102 requests call 106 over WiFi in operation 404 with a request 306. In some examples, request 306 comprises an IKE_AUTH Request message. In some examples, call 106 comprises a VoWiFi call or a ViWiFi call. Requesting call 106 may comprise requesting an outgoing call from UE 102 to UE 104 or requesting a connection to an incoming call from UE 104. Request 306 identifies (includes) UE network address 122 and UE ID 121.

In operation 406, packet data gateway 116 transmits a request 308 to authentication server 117, and authentication server 117 receives request 308 from packet data gateway 116. In some examples, request 308 comprises a diameter extensible authentication protocol (EAP) request (DER). Diameter is an authentication, authorization, and accounting protocol for computer networks. Request 308 identifies (includes) UE network address 122 and UE ID 121.

Based on at least receiving request 308, authentication server 117 transmits authentication request 120 to subscriber database node 118 in operation 408. Authentication request 120 identifies (includes) UE network address 122 and UE ID 121. In some examples, UE network address 122 comprises an IP address. In some examples, authentication request 120 comprises a multimedia authentication request (MAR). FIG. 3 shows authentication request 120 as a MAR 310. The content of MARs is specified by Third Generation Partnership Project (3GPP) technical standards (TSs). Currently, 3GPP TSs do not identify a field for UE network address 122, so a new field is needed in MARs for this information.

Subscriber database node 118 receives authentication request 120 from authentication server 117 in operation 410. Authentication request 120 identifies UE 102 (with UE ID 121) and identifies UE network address 122 (the network address of UE 102). This may be generalized as a first wireless network node receiving authentication request 120 from a second wireless network node, with subscriber database node 118 being the first wireless network node and authentication server 117 being the second wireless network node. In some examples, the first wireless network node comprises an HSS and/or a UDM node. In some examples, the second wireless network node comprises an AAA server.

In operation 412, UE location 124 (the location of UE 102) is determined based on at least UE network address 122 (the network address of UE 102). In some examples, determining the location of UE 102 comprises determining a geographical region and/or a country in which UE 102 is located. In some examples, UE location 124 is determined based on at least the IP address of UE 102. In some examples, subscriber database node 118 determines UE location 124. In some examples, authentication server 117 determines UE location 124 and authentication request 120 identifies UE location 124 instead of, or in addition to, UE network address 122.

Operation 414 determines whether call 106 is permitted for UE 102 based on at least UE location 124, and is performed using decision operations 416-422. Operation 414 is also shown as a message 312 in FIG. 3. Decision operation 416 determines whether UE 102 is roaming, based on at least UE location 124. In some examples, determining that UE 102 is roaming comprises determining that UE 102 is located in a geographical region or a country different than a geographical region or a country in which wireless network 110 (specifically subscriber database node 118) is located.

If UE 102 is not roaming, flowchart 400 moves to operation 424 and permits call 106. Based on at least determining that call 106 is permitted for UE 102 wireless network 110 allows call 106 in operation 424. If however, UE 102 is roaming, flowchart 500 moves to decision operation 418.

Decision operation 418 determines whether UE 102 is located in a geographical region (or country) for which calls over WiFi or cellular networks are prohibited. This is one aspect of determining whether a call is permitted in a geographical region in which UE 102 is located. Decision operation 418, described below, is another aspect of that decision. If UE 102 is located in a geographical region (or country) for which calls over WiFi or cellular networks are prohibited, flowchart 400 moves to operation 426 and blocks call 106, as described below.

Otherwise, decision operation 420 determines whether call 106 is permitted for UE 102 during roaming. This is a general decision. Subscriber profile 123 may indicate that UE 102 does not have any roaming privileges at all. If UE 102 does not have any roaming privileges at all, there is no need to compare UE location 124 with any list of permitted roaming areas. If decision operation 420 determines that UE 102 does not have any roaming privileges at all, flowchart 400 moves to operation 426 and blocks call 106. Otherwise, flowchart 400 moves to decision operation 422.

Decision operation 422 determines whether UE 102 has roaming privileges in the specific geographical region or country in which UE 102 is located. If not, flowchart 400 moves to operation 426 and blocks call 106. Otherwise, flowchart 400 moves to operation 424 and allows call 106.

Operation 426 blocks call 106 and is performed using operations 428-434. Based on at least determining that call 106 is not permitted for UE 102, subscriber database node 118 transmits a message 314 to authentication server 117 that blocks call 106, in operation 428. In some examples, message 314 comprises a 5004 error code, such as "5004 Roaming Not Allowed" message.

Authentication server 117 receives message 314 in operation 430 and, based on at least receiving message 314, authentication server 117 transmits a message 316 to packet data gateway 116 that blocks call 106, in operation 432. In some examples, message 316 comprises a 5004 error code, such as "5004 Roaming Not Allowed" message.

In operation 434, packet data gateway 116 terminates the call attempt with UE 102. This is accomplished, in some examples, using messages 318 and 320. In some examples, message 318 comprises an IKE_Info_Delete Request and message 320 comprises an IKE_Info_Delete Response.

FIG. 5A illustrates a flowchart 500 of exemplary operations associated with examples of architecture 100. In some examples, at least a portion of flowchart 500 may be performed using one or more computing devices 600 of FIG. 6. Flowchart 500 commences with operation 502, which includes receiving, by a first wireless network node, from a second wireless network node, an authentication request, the authentication request identifying a UE that is requesting a call over WiFi and identifying a network address of the UE.

Operation 504 includes, based on at least the network address of the UE, determining a location of the UE. Operation 506 includes, based on at least the location of the UE, determining whether the call is permitted for the UE. Operation 508 includes, based on at least determining that the call is not permitted for the UE, transmitting, to the second wireless network node, a first message that blocks the call.

FIG. 5B illustrates a flowchart 550 of exemplary operations associated with examples of architecture 100. In some examples, at least a portion of flowchart 550 may be performed using one or more computing devices 600 of FIG. 6. Flowchart 550 commences with operation 552, which includes receiving, by a second wireless network node, from a packet data gateway, a request for a call over WiFi, the request including a network address of a UE.

Operation 554 includes, based on at least receiving the request, transmitting an authentication request to a first wireless network node, the authentication request identifying the UE that is requesting the call over WiFi and identifying the network address of the UE. Operation 556 includes, receiving a first message that blocks the call. Operation 558 includes, based on at least receiving the first message that blocks the call, transmitting, to the packet data gateway, a second message that blocks the call.

Figure 6:
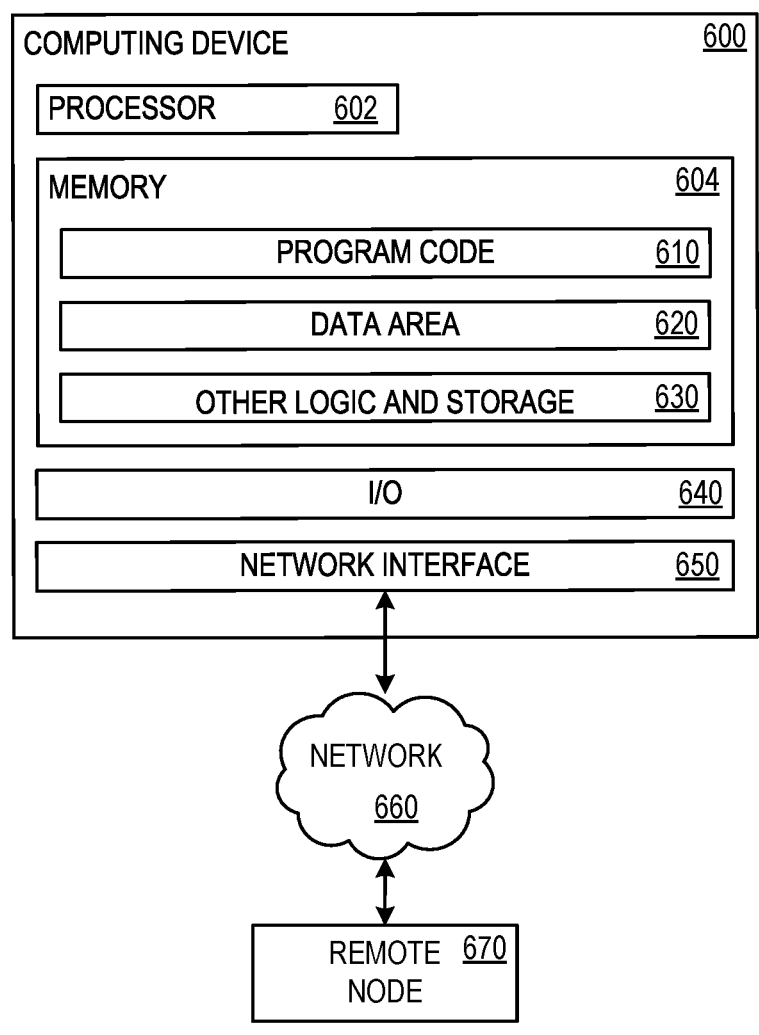
FIG. 6 illustrates a block diagram of a computing device suitable for implementing various aspects of the disclosure.

FIG. 6 illustrates a block diagram of computing device 600 that may be used as any component described herein that may require computational or storage capacity. Computing device 600 has at least a processor 602 and a memory 604 that holds program code 610, data area 620, and other logic and storage 630. Memory 604 is any device allowing information, such as computer executable instructions and/or other data, to be stored and retrieved. For example, memory 604 may include one or more random access memory (RAM) modules, flash memory modules, hard disks, solid-state disks, persistent memory devices, and/or optical disks. Program code 610 comprises computer executable instructions and computer executable components including instructions used to perform operations described herein. Data area 620 holds data used to perform operations described herein. Memory 604 also includes other logic and storage 630 that performs or facilitates other functions disclosed herein or otherwise required of computing device 600. An input/output (I/O) component 640 facilitates receiving input from users and other devices and generating displays for users and outputs for other devices. A network interface 650 permits communication over external network 660 with a remote node 670, which may represent another implementation of computing device 600. For example, a remote node 670 may represent another of the above-noted nodes within architecture 100.

ADDITIONAL EXAMPLES

An example system comprises: a processor; and a computer-readable medium storing instructions that are operative upon execution by the processor to: receive, by a first wireless network node, from a second wireless network node, an authentication request, the authentication request identifying a UE that is requesting a call over WiFi and identifying a network address of the UE; based on at least the network address of the UE, determine a location of the UE; based on at least the location of the UE, determine whether the call is permitted for the UE; and based on at least determining that the call is not permitted for the UE, transmit, to the second wireless network node, a first message that blocks the call.

Another example system comprises: a processor; and a computer-readable medium storing instructions that are operative upon execution by the processor to: receive, by a second wireless network node, from a packet data gateway, a request for a call over WiFi, the request including a network address of a UE; based on at least receiving the request, transmit an authentication request to a first wireless network node, the authentication request identifying the UE that is requesting the call over WiFi and identifying the network address of the UE; receive a first message that blocks the call; and based on at least receiving the first message that blocks the call, transmit, to the packet data gateway, a second message that blocks the call.

An example method of wireless communication comprises: receiving, by a first wireless network node, from a second wireless network node, an authentication request, the authentication request identifying a UE that is requesting a call over WiFi and identifying a network address of the UE; based on at least the network address of the UE, determining a location of the UE; based on at least the location of the UE, determining whether the call is permitted for the UE; and based on at least determining that the call is not permitted for the UE, transmitting, to the second wireless network node, a first message that blocks the call.

Another example method of wireless communication comprises: receiving, by a second wireless network node, from a packet data gateway, a request for a call over WiFi, the request including a network address of a UE; based on at least receiving the request, transmitting an authentication request to a first wireless network node, the authentication request identifying the UE that is requesting the call over WiFi and identifying the network address of the UE; receiving a first message that blocks the call; and based on at least receiving the first message that blocks the call, transmitting, to the packet data gateway, a second message that blocks the call.

One or more example computer storage devices has computer-executable instructions stored thereon, which, upon execution by a computer, cause the computer to perform operations comprising: receiving, by a first wireless network node, from a second wireless network node, an authentication request, the authentication request identifying a UE that is requesting a call over WiFi and identifying a network address of the UE: based on at least the network address of the UE, determining a location of the UE; based on at least the location of the UE, determining whether the call is permitted for the UE; and based on at least determining that the call is not permitted for the UE, transmitting, to the second wireless network node, a first message that blocks the call.

One or more example computer storage devices has computer-executable instructions stored thereon, which, upon execution by a computer, cause the computer to perform operations comprising: receiving, by a second wireless network node, from a packet data gateway, a request for a call over WiFi, the request including a network address of a UE: based on at least receiving the request, transmitting an authentication request to a first wireless network node, the authentication request identifying the UE that is requesting the call over WiFi and identifying the network address of the UE; receiving a first message that blocks the call; and based on at least receiving the first message that blocks the call, transmitting, to the packet data gateway, a second message that blocks the call.

Alternatively, or in addition to the other examples described herein, examples include any combination of the following:

the network address comprises an IP address;

the authentication request comprises an MAR;

the first wireless network node comprises an HSS or a UDM node; and the second wireless network node comprises an AAA server;

the first message comprises a 5004 error code;

the second message comprises a 5004 error code;

based on at least the location of the UE, determining whether the UE is roaming;

based on at least determining that the UE is roaming, determining whether a call is permitted in a geographical region in which the UE is located;

determining whether the call is permitted for the UE during roaming;

determining whether the call is permitted for the UE during roaming within the geographical region in which the UE is located;

receiving, by the second wireless network node, from a packet data gateway, a request for the call over WiFi, the request identifying the network address of the UE;

based on at least receiving the request, transmitting the authentication request to the first wireless network node, the authentication request including the network address of the UE;

receiving the first message that blocks the call;

based on at least receiving the first message that blocks the call, transmitting, to the packet data gateway, a second message that blocks the call;

the call comprises a VoWiFi call;

the call comprises a video call over WiFi;

requesting the call comprises requesting an outgoing call;

requesting the call comprises requesting a connection to an incoming call;

the first wireless network node determines the location of the UE;

the first wireless network node determines whether the UE is roaming;

the first wireless network node determines whether the call is permitted for the UE;

the first wireless network node responds with the message that blocks the call;

the second wireless network node transmits the authentication request to the first wireless network node;

the second wireless network node receives the first message that blocks the call;

the second wireless network node transmits the second message that blocks the call;

the first wireless network node comprises a subscriber database node;

determining the location of the UE comprises determining a country in which the UE is located;

determining the location of the UE comprises determining the location of the UE based on at least the IP address;

based on at least determining that the call is permitted for the UE, allowing the call;

determining that the UE is roaming comprises determining that the UE is located in a geographical region different than a geographical region in which the first wireless network node is located;

determining that the UE is roaming comprises determining that the UE is located in a country different than a country in which the first wireless network node is located;

determining whether the call is permitted in the geographical region in which the UE is located comprises determining whether the geographical region in which the UE is located is a geographical region for which calls over WiFi or wireless networks are prohibited;

the packet data gateway comprises an ePDG;

packet data gateway provides an interface between a wireless network comprising the first wireless network node and an external network;

the external network is untrusted by the wireless network; and the external network comprises the internet.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of wireless communication, the method comprising:

receiving, by a home subscriber server (HSS), a multimedia authentication request (MAR) identifying a user equipment (UE) that is requesting a voice over WiFi (VoWiFi) or video over WiFi (ViWiFi) call, wherein the MAR includes an internet protocol (IP) address of the UE;

determining, by the HSS, a geographical location associated with the IP address of the UE based on an IP address database maintained by the HSS;

determining, by the HSS, that the VoWiFi or ViWiFi call is being requested while the UE is roaming based on the geographical location associated with the IP address of the UE; and transmitting, by the HSS responsive to the MAR, a 5004 Roaming Not Allowed error message that blocks the VoWiFi or ViWiFi call based on to determining that the VoWiFi or ViWiFi call is being requested while the UE is roaming.

2. The method of claim 1, wherein the geographical location corresponds to a different country than that associated with a home wireless network of the UE.

3. The method of claim 1, wherein the IP address database maintained by the HSS maps IP addresses to geographical regions.

4. The method of claim 1, wherein the IP address database maintained by the HSS maps IP addresses to countries.

5. A system comprising:

a processor; and a computer-readable medium storing programming instructions for execution by the processor, the programming instructions, upon execution by the processor, causing the system to perform the following operations:

receiving, by a home subscriber server (HSS), a multimedia authentication request (MAR) identifying a user equipment (UE) that is requesting a voice over WiFi (VoWiFi) or video over WiFi (ViWiFi) call, wherein the MAR includes an internet protocol (IP) address of the UE;

determining, by the HSS, a geographical location associated with the IP address of the UE based on an IP address database maintained by the HSS;

determining, by the HSS, that the VoWiFi or ViWiFi call is being requested while the UE is roaming based on the geographical location associated with the IP address of the UE; and transmitting, by the HSS responsive to the MAR, a 5004 Roaming Not Allowed error message that blocks the VoWiFi or ViWiFi call based on determining that the VoWiFi or ViWiFi call is being requested while the UE is roaming.

6. The system of claim 5, wherein the IP address database maintained by the HSS maps IP addresses to geographical regions.

7. The system of claim 5, wherein the IP address database maintained by the HSS maps IP addresses to countries.

8. One or more computer storage devices having programing instructions stored thereon, which, upon execution by a processor of a system, cause the system to perform the following operations:

receiving, by a home subscriber server (HSS), a multimedia authentication request (MAR) identifying a user equipment (UE) that is requesting a voice over WiFi (VoWiFi) or video over WiFi (ViWiFi) call, wherein the MAR includes an internet protocol (IP) address of the UE;

determining, by the HSS, a geographical location associated with the IP address of the UE based on an IP address database maintained by the HSS;

determining, by the HSS, that the VoWiFi or ViWiFi call is being requested while the UE is roaming based on the geographical location associated with the IP address of the UE; and transmitting, by the HSS responsive to the MAR, a 5004 Roaming Not Allowed error message that blocks the VoWiFi or ViWiFi call based on determining that the VoWiFi or ViWiFi call is being requested while the UE is roaming.

9. The one or more computer storage devices of claim 8, wherein the geographical location corresponds to a different country than that associated with a home wireless network of the UE.

10. The one or more computer storage devices of claim 8, wherein the IP address database maintained by the HSS maps IP addresses to geographical regions.

11. The one or more computer storage devices of claim 8, wherein the IP address database maintained by the HSS maps IP addresses to countries.

* * * * *